A. T. DAWSON & J. HORNE.
AMMUNITION HOISTING APPARATUS FOR HEAVY ORDNANCE.
APPLICATION FILED APR. 15, 1908.

938,560.

Patented Nov. 2, 1909.
7 SHEETS—SHEET 2.

A. T. DAWSON & J. HORNE.
AMMUNITION HOISTING APPARATUS FOR HEAVY ORDNANCE.
APPLICATION FILED APR. 15, 1908.

938,560.

Patented Nov. 2, 1909.
7 SHEETS—SHEET 3.

A. T. DAWSON & J. HORNE.
AMMUNITION HOISTING APPARATUS FOR HEAVY ORDNANCE.
APPLICATION FILED APR. 15, 1908.

938,560.

Patented Nov. 2, 1909.
7 SHEETS—SHEET 4.

UNITED STATES PATENT OFFICE.

ARTHUR TREVOR DAWSON, OF WESTMINSTER, LONDON, AND JAMES HORNE, OF BARROW-IN-FURNESS, ENGLAND, ASSIGNORS TO VICKERS SONS & MAXIM LIMITED, OF LONDON, ENGLAND.

AMMUNITION-HOISTING APPARATUS FOR HEAVY ORDNANCE.

938,560. Specification of Letters Patent. Patented Nov. 2, 1909.

Application filed April 15, 1908. Serial No. 427,167.

*To all whom it may concern:*

Be it known that we, ARTHUR TREVOR DAWSON, lieutenant Royal Navy, director and superintendent of Ordnance Works, and JAMES HORNE, engineer, both subjects of the King of Great Britain, residing, respectively, at 32 Victoria street, Westminster, in the county of London, England, and care of Vickers Sons & Maxim Limited, Naval Construction Works, Barrow-in-Furness, in the county of Lancaster, England, have invented certain new and useful Improvements Relating to Ammunition-Hoisting Apparatus for Heavy Ordnance, of which the following is a specification.

Our improvements relate to ammunition hoisting apparatus for heavy ordnance and are chiefly designed for use in connection with turrets carrying three guns but are partly applicable to turrets for a single gun or for two guns.

The said improvements have for their objects the insuring of a continuous and rapid supply of ammunition to the guns in a direct and simple manner, the acceleration of the rate of firing and the maintenance of the supply of ammunition for any desired length of time.

The improvements also afford means whereby the ammunition can be transferred from its stowed position on the lower decks of the ship, to the guns without any great manual labor, such as would easily fatigue the gun's crew.

According to our invention we effect the supply of ammuntion for a three gun turret, by three independent hoisting cages comprising a central cage situated between two outer or side cages all of which are arranged to work in the passages of a trunk structure rotating with the rotating turret. The two side cages are provided with tilting projectile trays, and also with powder charge containers to enable the cages to automatically deliver their projectile and powder charges practically simultaneously to ammunition receptacles fixed to the floor of a working chamber located below the gun platform, the projectiles being transferred to their respective trays from waiting trays and rotating bogies situated in the shell room. In conjunction with the aforesaid ammunition receptacles we employ rammers for simultaneously transferring the ammunition from each receptacle to the respective gun loading cages. The central cage is provided with projectile trays and powder charge containers which are automatically brought into alinement with the central gun loading cage after reaching the working chamber, the projectile and powder charges being longitudinally supplied to the aforesaid trays from waiting trays situated in the shell and powder rooms.

In order that our said invention may be clearly understood and readily carried into effect we will describe the same more fully with reference to the accompanying drawings in which:—

Like letters of reference indicate similar parts in all the figures.

$A^1$ $A^2$ $A^3$ are the three guns which are mounted on the turntable B.

C is the working chamber wherein the transference of the ammunition is effected from the lower or trunk hoisting cages to the upper or gun loading cages $A^{1x}$ $A^{2x}$ $A^{3x}$. This working chamber is situated below the turntable and connected thereto so as to rotate with it.

D is the trunk structure in which the lower hoisting cages work, the said trunk extending down to the powder and shell rooms E, F, and opening at its upper end into the working chamber.

Figure 1:
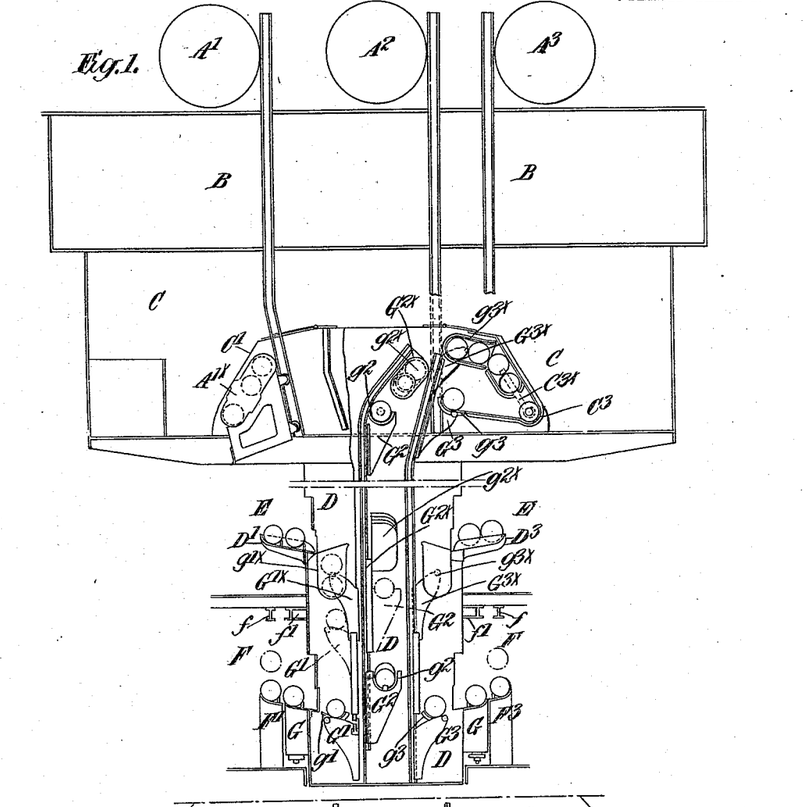
Figure 1 is a transverse section, and Fig. 2 a longitudinal section showing one form of our improved ammunition hoisting apparatus applied to a three-gun turret mounting in which the hoist trunk rotates with the turret and opens at its upper end into a working chamber situated immediately below the turntable of the turret and rotating therewith.
Figure 2:
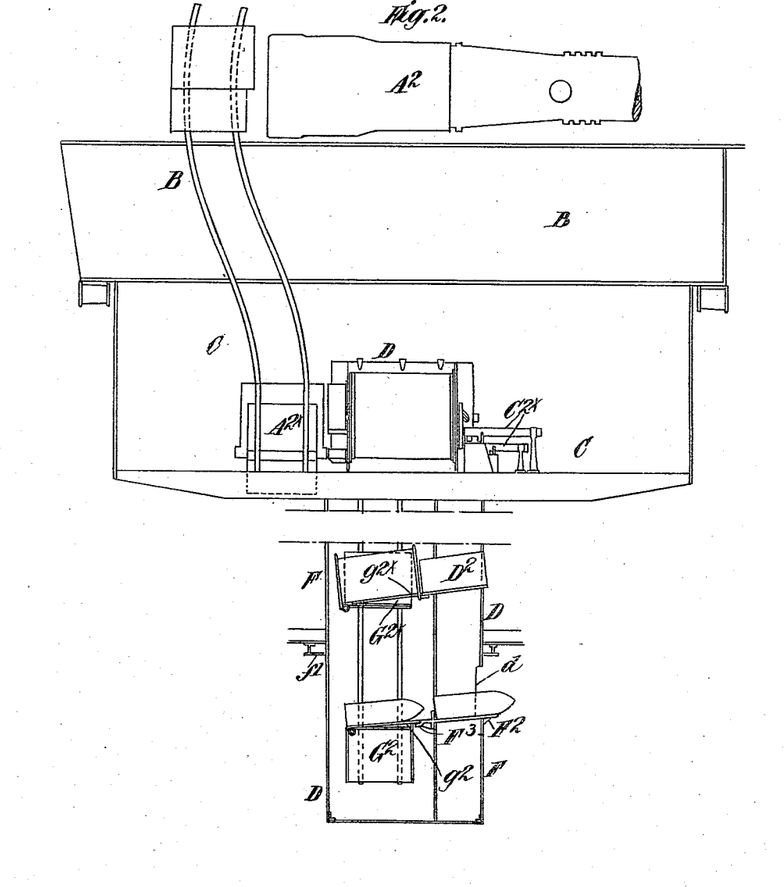
Figure 3:
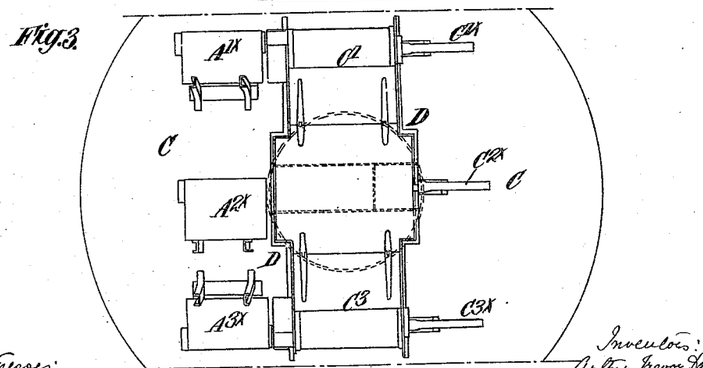
Fig. 3 is a plan of the working chamber.

Referring first more particularly to Figs. 1 to 3, the said trunk D is connected with the working chamber C so as to revolve with the said chamber and the turntable B. In the shell room F the projectiles are transferred from the storage bins to suitable positions relatively to the trunk D by means of trolleys that travel on overhead rails $f$ as is well understood. The projectiles for the two side projectile cages $G^1$ $G^3$, are deposited on waiting trays $F^1$ $F^3$ fixed to the floor of the shell room, whence they are permitted to roll on to trays carried by rotating bogies G of the usual type, which are capable of being rotated relatively to the trunk or to the ship, in order to bring the projectiles to the openings leading to the said projectile cages, irrespective of the position into which the turret and guns may have been trained. For the central projectile cage $G^2$ the projectiles are transported by trolleys along an overhead rail $f^1$ surrounding the trunk, in order that the projectiles may be brought to an opening $d$ (Fig. 2) conveniently arranged relatively to a longitudinally inclined waiting tray $F^2$ from which they are in turn transferred to the projectile cage $G^2$. To facilitate the transference of the projectile to the said cage, the projectile tray of the latter is so constructed as to assume a longitudinally inclined position when the cage is lowered to the bottom of the trunk, but when the said cage is being raised in the trunk, this tray assumes a horizontal position. To this end the projectile tray $g^2$ is pivoted at one end to the projectile cage $G^2$ so that when the said cage reaches the bottom of the trunk D a projection $F^3$ on the inclined waiting tray $F^2$ causes the projectile tray $g^2$ to assume an inclined position in line with the said waiting tray $F^2$. When the projectile cage $G^2$ ascends the weight of the projectile causes the said tray $g^2$ to again assume the horizontal position.

The powder charges for the two side powder cages $G^{1x}$ $G^{3x}$ are deposited from the powder room E above the shell room into waiting trays $D^1$ $D^3$ attached to the trunk, the powder charges being so placed in the waiting trays as to roll into the said powder cages sidewise, while for the center powder cage $G^{2x}$ they are deposited in a longitudinally inclined waiting tray $D^2$ and transferred to this cage endwise. The center powder cage $G^{2x}$, like the center projectile cage $G^2$, is adapted to be tilted into an inclined position to receive the powder charges from the inclined loading tray $D^2$, but when the cage is being raised will occupy a horizontal position. The powder tray $g^{2x}$ is tilted in a similar manner to the shell or projectile tray $g^2$. The respective projectile and powder cages appertaining to each gun, are arranged to work together in the same passage of the trunk on common guide rails H; and are raised by the same hoisting rope J worked preferably by a hydraulic press.

Figure 10:
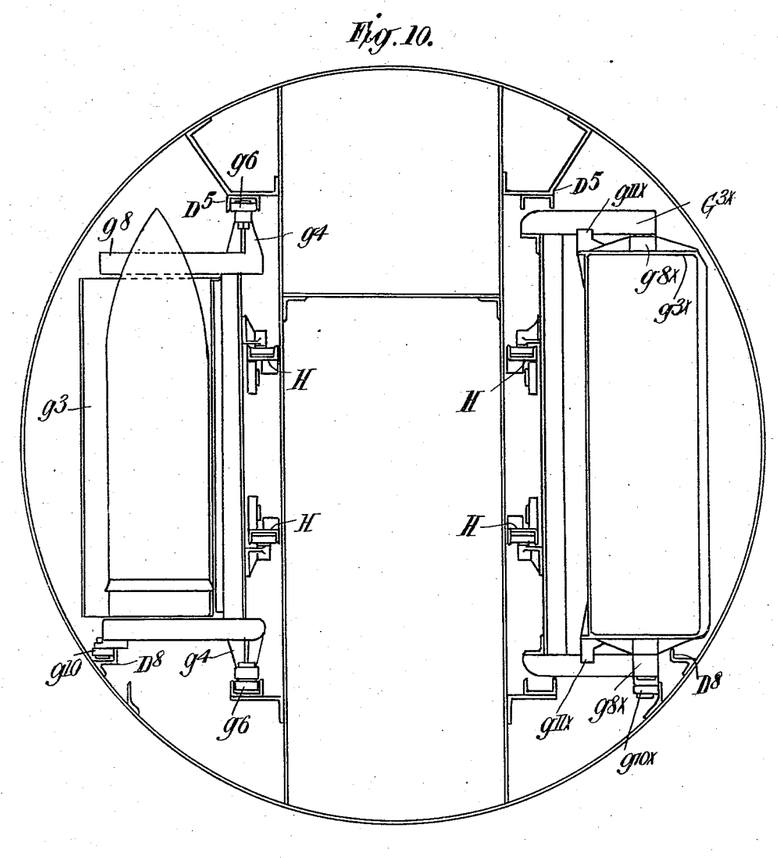
Fig. 10 is a horizontal section drawn to a larger scale showing the shell cage on the left and the powder cage on the right of the trunk.

In order to enable the aforesaid cages to occupy their required positions for receiving the projectiles and the powder charges from the shell and powder rooms respectively, and also for practically simultaneously delivering the projectiles and the powder charges into the ammunition receptacles situated in the working chamber, the projectile cage is connected to the hoisting rope J and is capable of being raised or lowered independently of the powder cage and also of being automatically connected thereto and disconnected therefrom. For this purpose a bracket $g^4$ is fixed to each end of the projectile cages $G^1$ and $G^3$ and hinged to each bracket $g^4$ is a connecting rod $g^5$ carrying at its upper end a roller $g^6$. Supported within the trunk in proximity to the aforesaid connecting rods are four guide rails $D^5$ (Fig. 10) to receive the aforesaid rollers $g^6$ for the purpose of retaining the connecting rods $g^5$ in a position to engage with sockets $g^{4x}$ projecting from the opposite ends of the powder cages $G^{1x}$ and $G^{3x}$, when the projectile cages are raised into proximity with the aforesaid powder cages by the hoisting ropes J. The upper ends of the connecting rods are formed with holes $g^7$ which come into alinement with spring controlled locking bolts $g^{5x}$ when the ends of the connecting rods are in engagement with the aforesaid sockets. Each of the locking bolts is mounted horizontally in bearing $g^{6x}$ provided for the same on each powder cage, and carries a projecting stud or roller $g^{7x}$ for engagement with two cam surfaces $D^6$ $D^7$ fixed to the trunk D.

Figure 8:
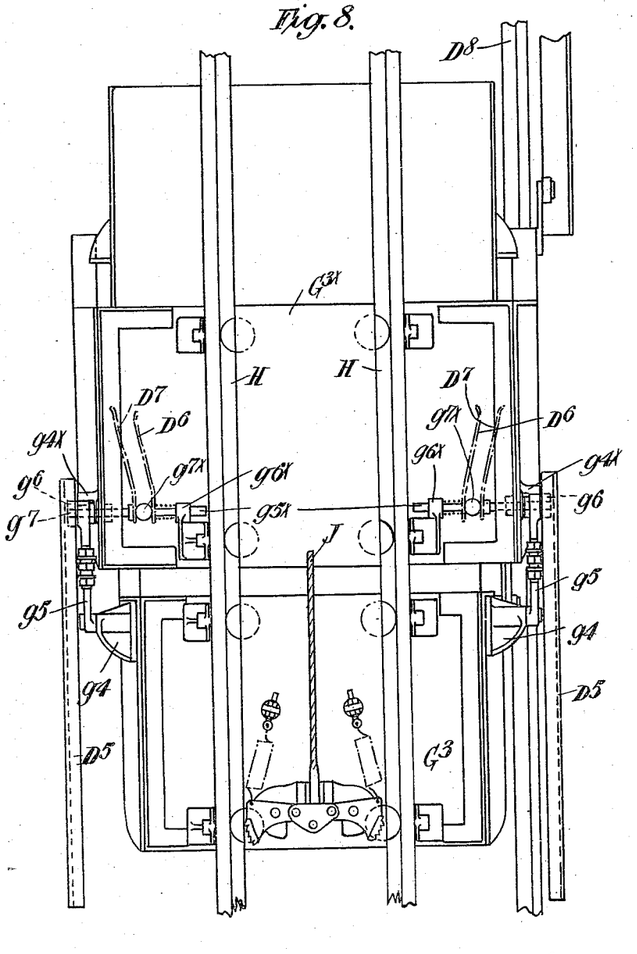
Fig. 8 is a longitudinal section drawn to a larger scale of a portion of the lower end of the rotating hoist trunk showing the powder cage just about to be raised by the projectile cage.

In the position shown in Fig. 8, the ends of the connecting rods have been brought into engagement with their sockets and the powder cage is about to be raised by the further movement of the projectile cage. At the commencement of the upward movement of the powder cage, the rollers $g^{7x}$ on the locking bolts $g^{5x}$ travel up the inclines of the cam surfaces $D^6$ thereby forcing the bolts outward and causing the ends thereof to pass into the holes $g^7$ in the aforesaid connecting rods and to lock the powder and projectile cages together in which condition they are retained during the greater portion of their ascent and descent. Just before the termination of the downward movement of the powder cages, the rollers $g^{7x}$ come into engagement with the inclines of the cam surfaces $D^7$ so as to withdraw the locking bolts out of engagement with the aforesaid connecting rods to allow the projectile cages to be lowered to their required position at the bottom of the trunk.

Figure 7:
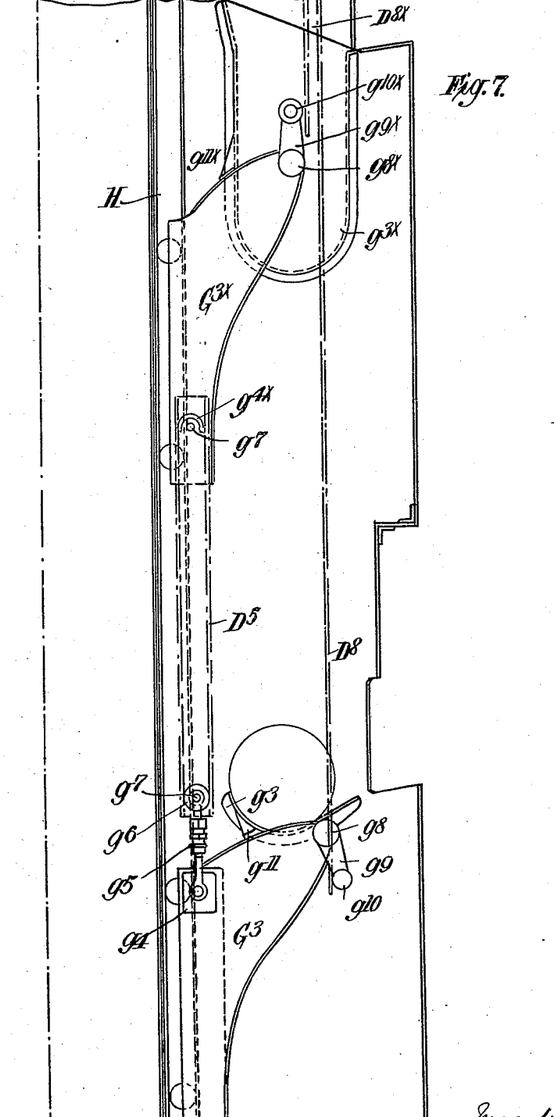
Fig. 7 is a transverse section drawn to a larger scale of a portion of the lower end of the rotating hoist trunk showing the powder and projectile cages in their lowermost positions.

As the various projectile and powder cages reach the working chamber C, those appertaining to the two side guns $A^1$ $A^3$ are cauesd to deliver their load automatically to ammunition receptacles or waiting receivers $C^1$ $C^3$ fixed to the floor of the working chamber C. For this purpose each of the projectile trays $g^1$ $g^3$ is hinged at $g^8$ to its respective projectile cage and is provided with an arm $g^9$ on the free end of which is mounted a roller $g^{10}$; stops $g^{11}$ are also provided to rest upon the cages for normally supporting the trays in the position shown in Fig. 7. Fixed inside the casing of the trunk D so as to extend vertically therein is a guide rail $D^8$ arranged in proximity to the aforesaid roller $g^{10}$. The rail $D^8$ is arranged parallel with the rail H with the exception of a short portion $D^9$ at its upper end which follows the direction indicated in Fig. 9. Arranged parallel with the aforesaid portion and at a sufficient distance therefrom to admit the roller $g^{10}$ is a short rail $D^{10}$.

Each of the powder containers $g^{1x}$ and $g^{3x}$ is in like manner hinged at $g^{8x}$ to its respective powder cage and is provided with an arm $g^{9x}$, roller $g^{10x}$ and stops $g^{11x}$ in the manner above described with refernce to the projectile tray. A guide rail $D^{8x}$ is also employed and is bent at $D^{9x}$ and provided with a short rail $D^{10x}$ arranged parallel with the bent portion $D^{9x}$ and spaced at a distance therefrom approximately equal to the diameter of the roller $g^{10x}$.

Figure 9:
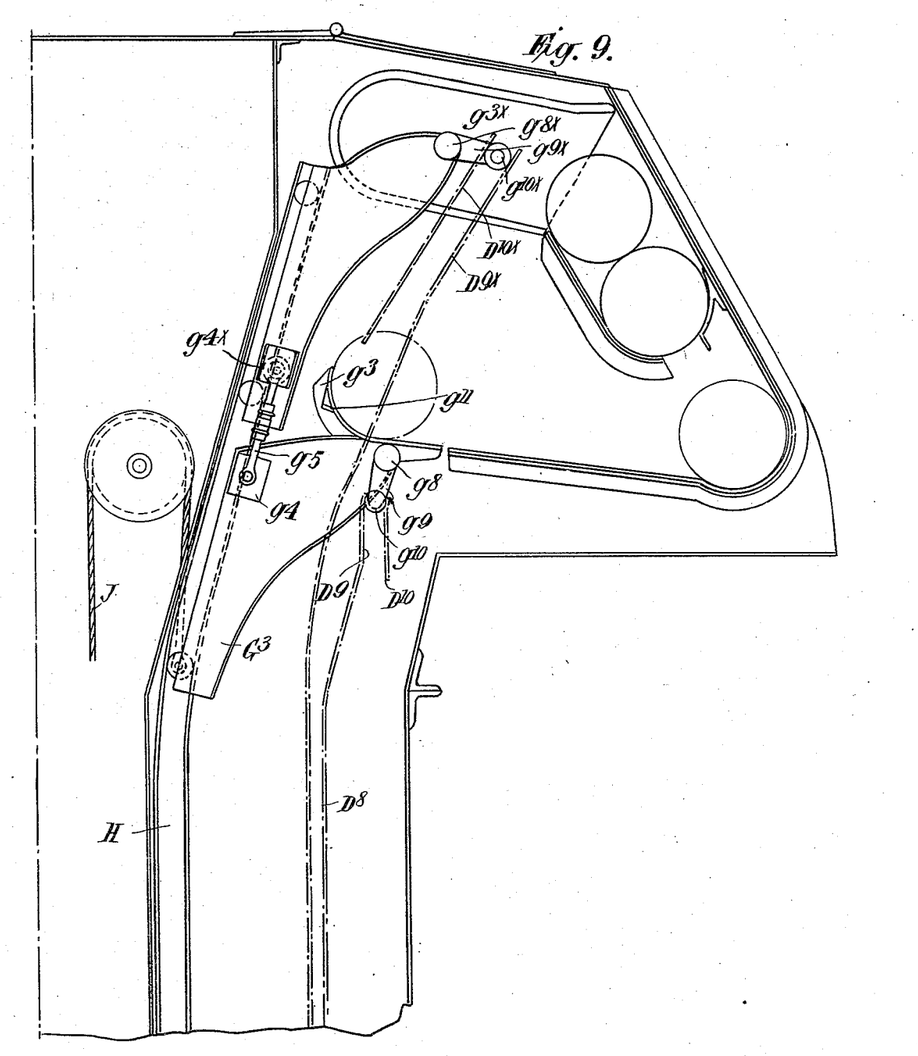
Fig. 9 is a transverse section drawn to a larger scale showing the powder and projectile cage at the top of the trunk.

By the arrangement above described, as the cages reach the top of the trunk and enter the ammunition receptacles, the rollers $g^{10}$ $g^{10x}$ respectively pass between the double rails $D^8$ $D^{10}$ and $D^{8x}$ $D^{10x}$ and are operated thereby to tilt the projectile trays and powder containers into a position for discharging their contents into the aforesaid ammunition receptacles as indicated in Fig. 9. The projectile and powder cages can then descend and the projectiles and powder charges that have been deposited therefrom into the ammunition receptacles or waiting receivers can be transferred by combined shell and powder rammers $C^{1x}$ $C^{3x}$ (Fig. 3) to the loading cages $A^{1x}$ $A^{3x}$ for the side guns $A^1$ $A^3$.

For the center gun $A^2$, the projectile and powder charges are transferred direct by means of rammers $C^{2x}$ from the projectile tray $g^2$ and the powder containers $g^{2x}$ of the cages $G^2$ $G^{2x}$ to the upper loading cage $A^{2x}$ for the center gun $A^2$, the said cages $G^2$ $G^{2x}$ being so deflected on their rails at the upper end of the trunk as to bring their trays $g^2$ and containers $g^{2x}$ directly in line with the respective projectile and powder compartments of the gun loading cages $A^{2x}$ (see Fig. 1).

Figure 4:
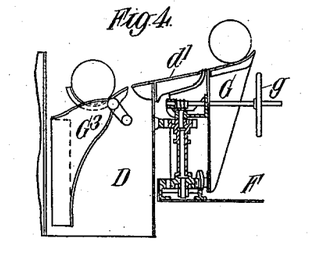
Fig. 4 is a transverse section of a portion of the lower end of the rotating hoist trunk, showing an improved form of rotating bogie.
Figure 5:
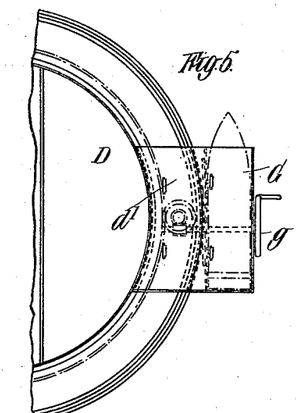
Fig. 5 is a plan of the same.
Figure 6:
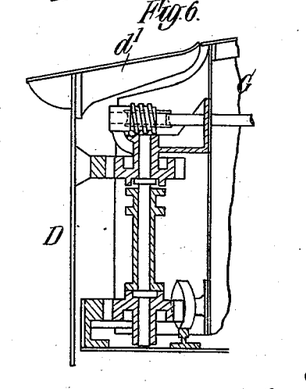
Fig. 6 is an enlarged view of the actuating mechanism of this rotating bogie.

Instead of arranging in the shell room F the aforesaid rotating bogies G and the waiting trays $F^1$ $F^3$ appertaining to the side projectile cages $G^1$ $G^3$ as shown in Fig. 1, we may arrange the said bogies farther away from the trunk, so as to be clear of the center hand trolley rail $f^1$ appertaining to the central projectile cage $G^2$, and so that the hand-wheel for actuating the bogie will be in a more accessible position than heretofore. Such an arrangement is illustrated in Figs. 4 to 6 wherein $G^3$ is one of the side projectile cages and G one of the bogies which is actuated by the hand wheel $g$ through the mechanism shown in Fig. 6 in the usual manner. In this case the waiting position for the projectiles is between the bogie and the trunk on a tray $d^1$ situated outside the trunk and not inside as has been the case before; this tray also serves for transferring the projectiles from the bogie to the projectile cage. In this case also the projectiles are deposited directly from the overhead hand trolleys to the bogie.

We wish it to be understood that although we have described our invention with special reference to a three-gun turret mounting, the above described ammunition hoisting apparatus for the center gun is applicable to a single gun turret, and the ammunition hoisting apparatus for the two side guns is applicable to a double gun turret.

What we claim and desire to secure by Letters Patent of the United States is:—

1. In ammunition hoisting apparatus for a three-gun turret mounting; the combination with the working chamber, the rotating hoist trunk, and the ammunition receptacles, of a central hoisting projectile cage and a central hoisting powder cage, two side hoisting projectile cages and two side hoisting powder cages, all working in said trunk, and means whereby the side cages are adapted to automatically deliver their projectiles and powder charges into the said receptacles in the working chamber.

2. In ammunition hoisting apparatus for a three-gun turret mounting; the combination with the working chamber the rotating hoist trunk and the ammunition receptacles, of a central hoisting cage and two side hoisting cages working in said trunk, projectile trays and powder charge containers pivotally connected with the side hoisting cages and means for automatically tilting said trays and containers.

3. In ammunition hoisting apparatus for a three-gun turret mounting; the combination with the working chamber, the rotating hoist trunk and the ammunition receptacles, of a central hoisting projectile cage and a central hoisting powder cage, two side hoisting projectile cages and two side hoisting powder cages all working in said trunk, and means whereby the projectile and powder charges can be supplied longitudinally to the central hoisting cages from the shell and powder rooms.

4. In ammunition hoisting apparatus for a three-gun turret mounting; the combination with the working chamber, the rotating hoist trunk and the ammunition receptacles, of a central hoisting projectile cage provided with a pivoted projectile tray and a central hoisting powder cage provided with a pivoted powder container, two side hoisting projectile cages and two side hoisting powder cages all working in said trunk, a rotating bogie situated in the shell room at a considerable distance from the said trunk and a tray or platform situated between the said bogie and the trunk, for enabling the projectiles to roll from the bogie into the projectile cage within the trunk.

5. In ammunition hoisting apparatus for a three-gun turret mounting; the combination with the working chamber and the rotating hoist trunk connected therewith, of a central hoisting cage and two side hoisting cages working in said trunk, a central gun loading cage and two side gun loading cages situated above said trunk, two side ammunition receptacles fixed to the floor of the working chamber, in positions for the two side cages to come in alinement therewith, means for supplying the ammunition to the central and side hoisting cages, means for enabling the side ammunition receptacles to receive the ammunition automatically from the corresponding side hoisting cages, two duplex side rammers for transferring the projectile and powder charge from each of the said receptacles to the respective gun loading cages, and a central duplex rammer for transferring the projectile and powder charge from the central hoisting cage direct to the central gun loading cage.

In testimony whereof we affix our signatures in presence of two witnesses.

ARTHUR TREVOR DAWSON.
JAMES HORNE.

Witnesses:
 HENRY KING,
 ALFRED PEAKS.